US006889600B2

(12) United States Patent
Rava

(10) Patent No.: US 6,889,600 B2
(45) Date of Patent: May 10, 2005

(54) DRINKS DISPENSING MACHINE

(75) Inventor: Angelo Lamberto Rava, Forli' (IT)

(73) Assignee: LORD S.r.l., Faenza (IT)

( * ) Notice: Subject to any disclaimer, the term of this patent is extended or adjusted under 35 U.S.C. 154(b) by 0 days.

(21) Appl. No.: 10/855,626

(22) Filed: May 28, 2004

(65) Prior Publication Data

US 2004/0216615 A1 Nov. 4, 2004

(51) Int. Cl.[7] .......................... A23L 1/00; A47J 31/00; A47J 31/54; A47J 27/21

(52) U.S. Cl. .................... 99/323.3; 99/275; 222/146.1; 222/146.2

(58) Field of Search ......................... 99/516, 536, 483, 99/275, 279–301, 323.1, 323.2, 323.3, 485; 222/135, 129.3, 129.4, 146.1, 146.2, 146.3, 146.4, 146.5; 126/344, 345; 392/441, 450, 451, 458, 461, 479, 480

(56) References Cited

U.S. PATENT DOCUMENTS 2,660,351 A * 11/1953 Thompson .................. 141/88
2,712,887 A * 7/1955 King ......................... 222/132
2,954,145 A * 9/1960 McCauley ............... 222/129.4
3,634,107 A * 1/1972 Cornelius .................... 99/275
4,191,101 A * 3/1980 Ogawa et al. ............ 99/323.3
4,211,342 A * 7/1980 Jamgochian et al. .... 222/129.4
4,649,809 A * 3/1987 Kanezashi .................. 99/290
5,332,123 A * 7/1994 Farber et al. ........... 222/129.4
5,375,508 A * 12/1994 Knepler et al. .............. 99/280
5,393,540 A * 2/1995 Bunn et al. ................ 426/231
5,465,649 A * 11/1995 Muis .......................... 99/280
5,579,678 A * 12/1996 Goerndt ...................... 99/280
5,975,365 A * 11/1999 Hsieh ...................... 222/129.4

* cited by examiner

*Primary Examiner*—Timothy F. Simone
(74) *Attorney, Agent, or Firm*—Young & Thompson

(57) ABSTRACT

The machine includes a first hydraulic circuit (2) with a tank for a liquid to be dispensed and a device for heating the liquid. The first hydraulic circuit (2) includes a removable tank (5) for containing the liquid to be dispensed and at least one delivery pipe (12), the first hydraulic circuit (2) being operative by command between an open configuration, in which the liquid is dispensed outside of the machine, and a closed position, in which liquid is circulated inside the machine. The device for heating the liquid includes a closed second hydraulic circuit (3) for a heating liquid and a heat exchanger (4) internally of which at least one tract of the delivery pipe (12) and at least one tract of the closed second hydraulic system (3) pass.

9 Claims, 2 Drawing Sheets

DRINKS DISPENSING MACHINE

DESCRIPTION

The machine of the invention is intended especially, though not exclusively, for dispensing hot chocolate drinks.

The prior art includes machines for hot drinks distribution, such as tea or chocolate, which use soluble powder preparations which are then dissolved in hot water. Although the preparation and distribution of the drinks are rapid and simple, the result obtained is, from the qualitative point of view, relatively poor. Especially in the case of chocolate, the use of powder products does not produce a drink having particularly good characteristics of density and taste. To obtain a sufficiently tasty drink pasteurized chocolate liquid has been used, which is then heated up. Usually the chocolate is heated in small recipients by means of steam, produced in the known-type machines for making coffee which are of the same sort as those found in cafés. This type of heating alters the properties of the liquid chocolate, leading to the production of lumps and jeopardising the natural taste of the chocolate. To obviate these drawbacks, in some applications large boilers are used, equipped with continuous mixers; a correct temperature is maintained inside the boilers together with a relatively large quantity of liquid chocolate—the quantity of chocolate being decided on the basis of an approximation of the amount needed. The drink resulting from use of these large boilers is of sufficiently high quality, as the chocolate is not damaged by direct contact with steam; but any remaining chocolate at the end of a period of use cannot be recuperated for reasons of hygiene and for other practical reasons connected to the impossibility of draining the chocolate off into another container for conservation, as successive cooling and re-heating operations would certainly damage the drink in terms of commestibility. The left-over chocolate is therefore to be considered waste, as it has to be eliminated.

The main aim of the present invention is to offer a machine for dispensing drinks which enables hot drinks to be dispensed quickly, especially chocolate, the drink being of high quality and with no use being made of pre-prepared powder.

A further aim of the present invention is that it provides a machine that enables recuperation and subsequent use of a quantity of drink which has remained unused.

A further aim of the present invention is to provide a machine for distributing drinks which is easy to clean and maintain in a hygienic state.

Further characteristics and advantages of the present invention will better emerge from the detailed description that follows of a preferred but non-exclusive embodiment of the invention, illustrated purely by way of non-limiting example in the accompanying figures of the drawings, in which.

Figure 1:
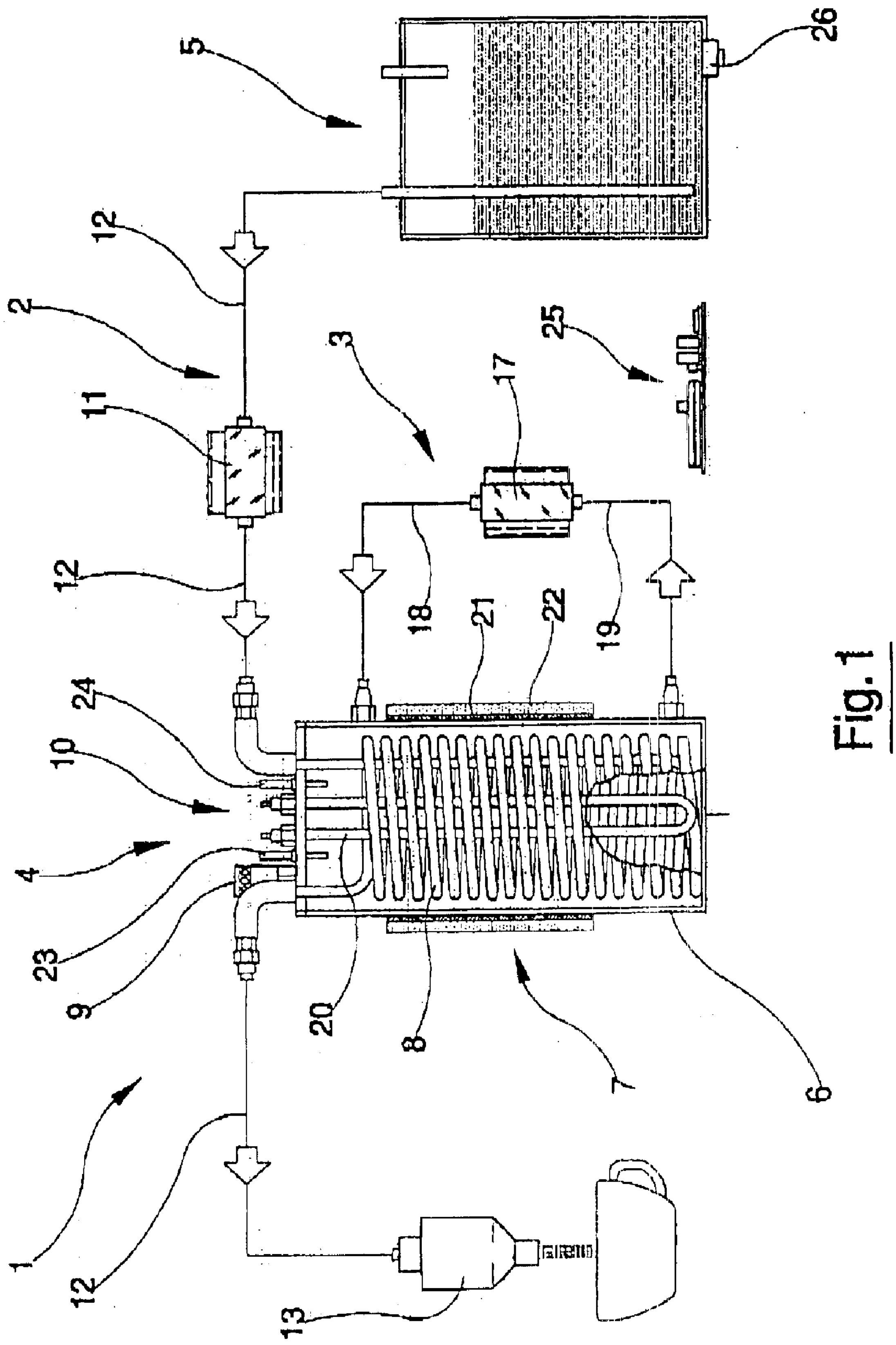
FIG. 1 is a view of the machine of the invention in an operative dispensing configuration, in which some components are shown in section in order better to illustrate the structure of the machine.
Figure 2:
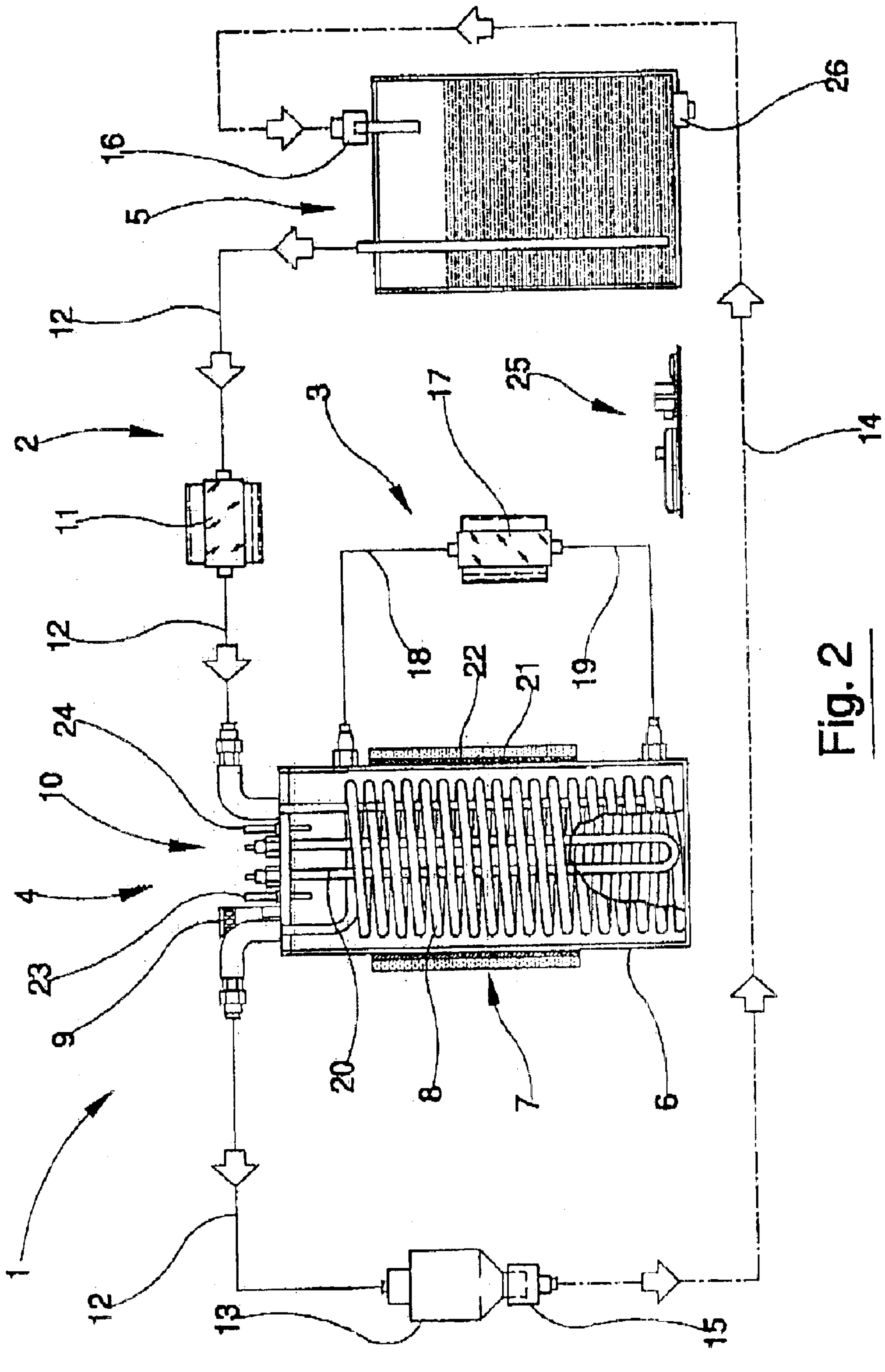
FIG. 2 is the view of the machine of FIG. 1, in a configuration in which a closed-circuit recirculation of the drink is performed.

With reference to the figures of the drawings, number 1 denotes in its entirety a machine for dispensing drinks according to the present invention. The machine comprises a first hydraulic circuit 2 for a liquid to be dispensed and means for heating the liquid to be dispensed.

The first hydraulic circuit 2 comprises a removable tank 5 for containing the liquid to be dispensed and at least one delivery pipe 12. The first hydraulic circuit 2 on command moves between an open configuration, in which liquid is dispensed to the outside, and a closed configuration, in which the liquid is recycled.

The means for heating the liquid to be dispensed comprise a second closed hydraulic circuit 3 for a heating liquid and a heat exchanger 4 internally of which a least a tract of the delivery pipe 12 and at least a tract of the second closed hydraulic circuit 3 pass.

The heat exchanger 4 comprises a tank 6 for the heating liquid which constitutes the tract of the second closed hydraulic circuit 3 involved in the heat exchange, and a spiral tract 8 which is a part of the mentioned tract of the delivery pipe 12. The heat exchanger 4 further comprises means 7 for heating the heating liquid, at least one safety valve 9 and means 10 for measuring the temperature of the heating liquid, which will be better described herein below. The first hydraulic circuit 2 further comprises a first pump 11 which on command operates on the delivery pipe 12, which delivery pipe 12 is connected to an end of the removable tank 5 and terminates at the other end in a dispenser 13. The first hydraulic circuit 2 further comprises a return pipe 14 having at one end a first connector 15 and at another end a second connector 16. The return pipe 14 can be connected to the dispenser 13 through the first connector 15 and to the tank 5 by the second connector 16, closing the first hydraulic circuit 2.

The second hydraulic circuit 3 comprises a second pump 17, connected in outlet to a delivery pipe 18 leading to the tank 6 and connected in inlet to a return pipe 19 from the tank 6.

In the illustrated embodiment, the means 7 for heating the heating liquid comprise an electrical resistance 20 inserted in the tank 6 coaxially to the spiral tract 8 and a binding electrical resistance 21 wrapped around the outside of the tank 6 and lagged externally with an insulating layer 22.

The means 10 for measuring the temperature of the heating liquid constitute an efficient safety system for correct machine functioning. The means 10 comprise, for example, at least one thermostat 23, for controlling the pump 17 and the electrical supply to the electrical resistances 20 and 21, and a bimetallic thermostat 24 with a manual reset. The thermostats 23 and 24 can be substituted by an electronic card 25 for control of the pump 17 and supply to the electrical resistances 20 and 21; the electronic card 25 comprises sensors for detecting the temperature of the heating liquid. If the temperature detected in the heat exchanger reaches levels that are too high, the thermostats 23 and 24 or the electronic card 25 intervene, cutting off supply to the electrical resistances 20 and 21 and returning supply when the machine has returned to normal functioning conditions. In particular, in the case where thermostats are used, they can be calibrated at different temperature levels. The bimetallic thermostat 24 with manual reset can be calibrated at temperatures considered to be especially dangerous, so that a direct intervention is required on the part of the operator to reset the resistances and return them to operating mode.

As a further control system for the machine operation the removable tank 5 comprises a microswitch 26 located externally of the bottom of the tank 5 and activated by the weight of the removable tank 5 to signal, by means of a pilot light or another element, that the tank 5 is empty. Apart from the pilot light, the machine comprises a light signalling that the machine is in operation and another light, controlled by one of the thermostats 23 or 24, or by the electronic card 25, which signals the machine ready state in relation to the temperature of the heating liquid. To activate the machine at least two switches are provided, namely a bipolar on/off switch and a button switch to actuate the pump 11 and start up a dispensing operation.

The machine operates as follows. The drink to be dispensed, for example liquid chocolate, is commanded to flow by means of the pump 11. Before reaching the dispenser 13, the chocolate is forced to pass through the spiral tract 8 located internally of the heat exchanger 4. In crossing the spiral tract 8 the chocolate is heated up by means of heat exchange with the heating liquid. The heating liquid is kept at a correct and constant temperature by the electrical resistances 20 and 21 and is kept in circulation through the tank 6 by means of the pump 17, so that the two fluids undergo a heat exchange operation in opposite directions. The chocolate heated up is effectively the chocolate which will be dispensed, with the advantage that the unused chocolate is not subject to any heat modification and can be reused up to its biological use-by date.

When the machine is no longer in use, the removable tank 5 can be removed and kept, for example, at a constant temperature in a refrigerator, and can be replaced by a similar task containing a cleaning fluid. By closing the first hydraulic circuit 2 across the return pipe 14 the cleaning fluid can be circulated through the machine, thus obtaining a very good level of hygiene for all the part which come into contact with the chocolate.

What is claimed is:

1. A drinks dispensing machine comprising a first hydraulic circuit (2) with a tank for a liquid to be dispensed and means for heating the liquid, wherein:

the first hydraulic circuit (2) comprises a removable tank (5) for containing the liquid to be dispensed and at least one delivery pipe (12), the first hydraulic circuit (2) being operative by command between an open configuration, in which the liquid is dispensed outside of the machine, and a closed position, in which liquid is circulated inside the machine; the means for heating the liquid comprise a closed second hydraulic circuit (3) for a heating liquid and a heat exchanger (4) internally of which at least one tract of the delivery pipe (12) and at least one tract of the closed second hydraulic system (3) pass.

2. The machine of claim 1, wherein the heat exchanger (4) comprises a tank (6) for the heating liquid which constitutes the at least one tract of the closed second hydraulic circuit (3), means (7) for heating the heating liquid, a spiral tract (8) which is part of the at least one tract of delivery pipe (12), at least one safety valve (9) and means (10) for measuring a temperature of the heating liquid.

3. The machine of claim 2, wherein the first hydraulic circuit (2) comprises a first pump (11) which is operative on command on the delivery pipe (12), which delivery pipe (12) is connected at an end thereof to the removable tank (5) and which delivery pipe (12) terminates at another end thereof in a dispenser (13), a return pipe (14) having at an end thereof a first connector (15) and at another end thereof a second connector (16), the return pipe (14) being connectable to the dispenser (13) by means of the first connector (15) and being connectable to the tank (5) by means of the second connector (16), thus completing the first hydraulic circuit (2).

4. The machine of claim 3, wherein the second hydraulic circuit (3) comprises a second pump (17), which is connected at an outlet thereof to a delivery pipe (18) leading to the tank (6) and connected at an inlet thereof to a return pipe (19) coming from the tank (6).

5. The machine of claim 4, wherein the means (7) for heating the heating liquid comprise an electrical resistance (20) inserted in the tank coaxially to the spiral tract (8) and a binding electrical resistance (21) wound externally about the tank (6) and externally lagged by an insulating layer (22).

6. The machine of claim 5, wherein the means (10) for measuring the temperature of the heating liquid comprise at least one thermostat (23) for controlling the pump (17) and controlling supply to the electrical resistances (20, 21), and a bimetallic thermostat (24) with manual reset.

7. The machine of claim 5, wherein the means (10) for measuring the temperature of the heating liquid comprise an electronic card (25) for controlling the pump (17) and controlling supply to the electrical resistances (20, 21) comprising sensors for detecting a temperature of the heating liquid.

8. The machine of claim 6, wherein the removable tank (5) comprises a microswitch (26) arranged externally of a bottom thereof and activated by a weight of the removable tank (5) for signalling an emptying of the removable tank (5).

9. The machine of claim 7, wherein the removable tank (5) comprises a microawitch (26) arranged externally of a bottom thereof and activated by a weight of the removable tank (5) for signalling an emptying of the removable tank (5).

* * * * *